United States Patent
Reese

(10) Patent No.: US 10,110,571 B2
(45) Date of Patent: *Oct. 23, 2018

(54) SECURING INTERNET OF THINGS COMMUNICATIONS ACROSS MULTIPLE VENDORS

(71) Applicant: SonicWall US Holdings Inc., Santa Clara, CA (US)

(72) Inventor: George Edward Reese, Wayzata, MN (US)

(73) Assignee: SonicWALL Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,061

(22) Filed: Oct. 4, 2017

(65) Prior Publication Data
US 2018/0048627 A1 Feb. 15, 2018

Related U.S. Application Data

(63) Continuation of application No. 15/340,449, filed on Nov. 1, 2016, now Pat. No. 9,825,921, which is a (Continued)

(51) Int. Cl.
H04L 29/06 (2006.01)
(52) U.S. Cl.
CPC .......... H04L 63/0428 (2013.01); H04L 63/02 (2013.01); H04L 63/06 (2013.01);
(Continued)

(58) Field of Classification Search
CPC .................................................. H04L 63/0471
(Continued)

(56) References Cited

U.S. PATENT DOCUMENTS 7,310,815 B2 12/2007 Yanovsky
7,545,748 B1 6/2009 Riddle
(Continued)

FOREIGN PATENT DOCUMENTS

EP 1 143 660 10/2001

OTHER PUBLICATIONS

U.S. Appl. No. 15/602,483 Final Office Action dated Nov. 30, 2017.
(Continued)

Primary Examiner — Longbit Chai
(74) Attorney, Agent, or Firm — Polsinelli LLP

(57) ABSTRACT

A secure connection between a user mobile device and a "Internet-of-Things" network-connected device (e.g., a home appliance or a vehicle) may be provided using an internet gateway residing in the public internet and a local gateway residing in a private network behind a firewall. The user device may receive an input through a software application and may generate an electronic instruction based on the input. The user device may then encrypt the electronic instruction and send the encrypted electronic instruction to the internet gateway over a secure connection (e.g., SSH, TLS). The internet gateway then sends the encrypted electronic instruction to the local gateway, which decrypts the encrypted electronic instruction, interprets it, and generates and transmits a device instruction to communicate with the network-connected device, either directly or through an intermediary device such as a third-party bridge or hub. Only the user device and local gateway have encryption/decryption keys.

19 Claims, 7 Drawing Sheets

Related U.S. Application Data continuation of application No. 14/722,064, filed on May 26, 2015, now Pat. No. 9,485,231.

(52) U.S. Cl.
CPC .......... *H04L 63/061* (2013.01); *H04L 63/166* (2013.01); *H04L 63/168* (2013.01)

(58) Field of Classification Search
USPC ........................................................ 713/153
See application file for complete search history.

(56) References Cited

U.S. PATENT DOCUMENTS

| | | | |
|---|---|---|---|
| 7,620,988 | B1 | 11/2009 | Hernacki |
| 8,601,114 | B1 | 12/2013 | Cooper |
| 9,485,231 | B1 | 11/2016 | Reese |
| 9,608,959 | B2 | 3/2017 | Carames |
| 9,825,921 | B2 | 11/2017 | Reese |
| 9,838,357 | B2 | 12/2017 | Carames |
| 9,888,011 | B2 | 2/2018 | Carames |
| 2004/0039940 | A1 | 2/2004 | Cox et al. |
| 2005/0010816 | A1 | 1/2005 | Yu et al. |
| 2005/0131997 | A1 | 6/2005 | Lewis et al. |
| 2006/0085850 | A1 | 4/2006 | Mayfield |
| 2007/0271361 | A1 | 11/2007 | Abzarian et al. |
| 2010/0034178 | A1 | 2/2010 | Bhar |
| 2010/0192224 | A1 | 7/2010 | Ferri et al. |
| 2011/0179362 | A1 | 7/2011 | Craddock et al. |
| 2013/0094376 | A1 | 4/2013 | Reeves |
| 2013/0125236 | A1 | 5/2013 | Lalonde et al. |
| 2013/0290404 | A1 | 10/2013 | Rajabi et al. |
| 2013/0291076 | A1 | 10/2013 | Duryee et al. |
| 2014/0344928 | A1 | 11/2014 | Sreedharan et al. |
| 2015/0007312 | A1 | 1/2015 | Pidathala et al. |
| 2015/0074259 | A1* | 3/2015 | Ansari ................... H04L 67/02 709/224 |
| 2015/0101008 | A1 | 4/2015 | Zent et al. |
| 2015/0213259 | A1 | 7/2015 | Du et al. |
| 2015/0288709 | A1 | 10/2015 | Singhal et al. |
| 2016/0057045 | A1 | 2/2016 | Gustin |
| 2016/0285824 | A1 | 9/2016 | Carames |
| 2016/0285912 | A1 | 9/2016 | Carames |
| 2017/0034179 | A1 | 2/2017 | Carames |
| 2017/0118181 | A1 | 4/2017 | Reese |
| 2017/0163687 | A1 | 6/2017 | Carames |
| 2017/0257374 | A1 | 9/2017 | Carames |
| 2018/0139179 | A1 | 5/2018 | Ettema et al. |
| 2018/0159827 | A1 | 6/2018 | Carames |

OTHER PUBLICATIONS

U.S. Appl. No. 15/830,325, Hugo Vazquez Carames, Non RFC-Compliant Protocol Classification Based on Real use, filed Dec. 4, 2017.
U.S. Appl. No. 14/665,315 Office Action dated Oct. 19, 2017.
U.S. Appl. No. 14/665,315 Final Office Action dated Mar. 1, 2017.
U.S. Appl. No. 14/665,315 Office Action dated Aug. 11, 2016.
U.S. Appl. No. 14/666,180 Final Office Action dated Aug. 22, 2016.
U.S. Appl. No. 14/666,180 Office Action dated Apr. 28, 2016.
U.S. Appl. No. 15/434,603 Office Action dated Mar. 24, 2017.
U.S. Appl. No. 14/815,866 Final Office Action dated Jun. 21, 2017.
U.S. Appl. No. 14/815,866 Office Action dated Jan. 12, 2017.
U.S. Appl. No. 15/602,483 Office Action dated Jun. 22, 2017.
U.S. Appl. No. 14/665,315 Final Office Action dated Jun. 4, 2018.

* cited by examiner

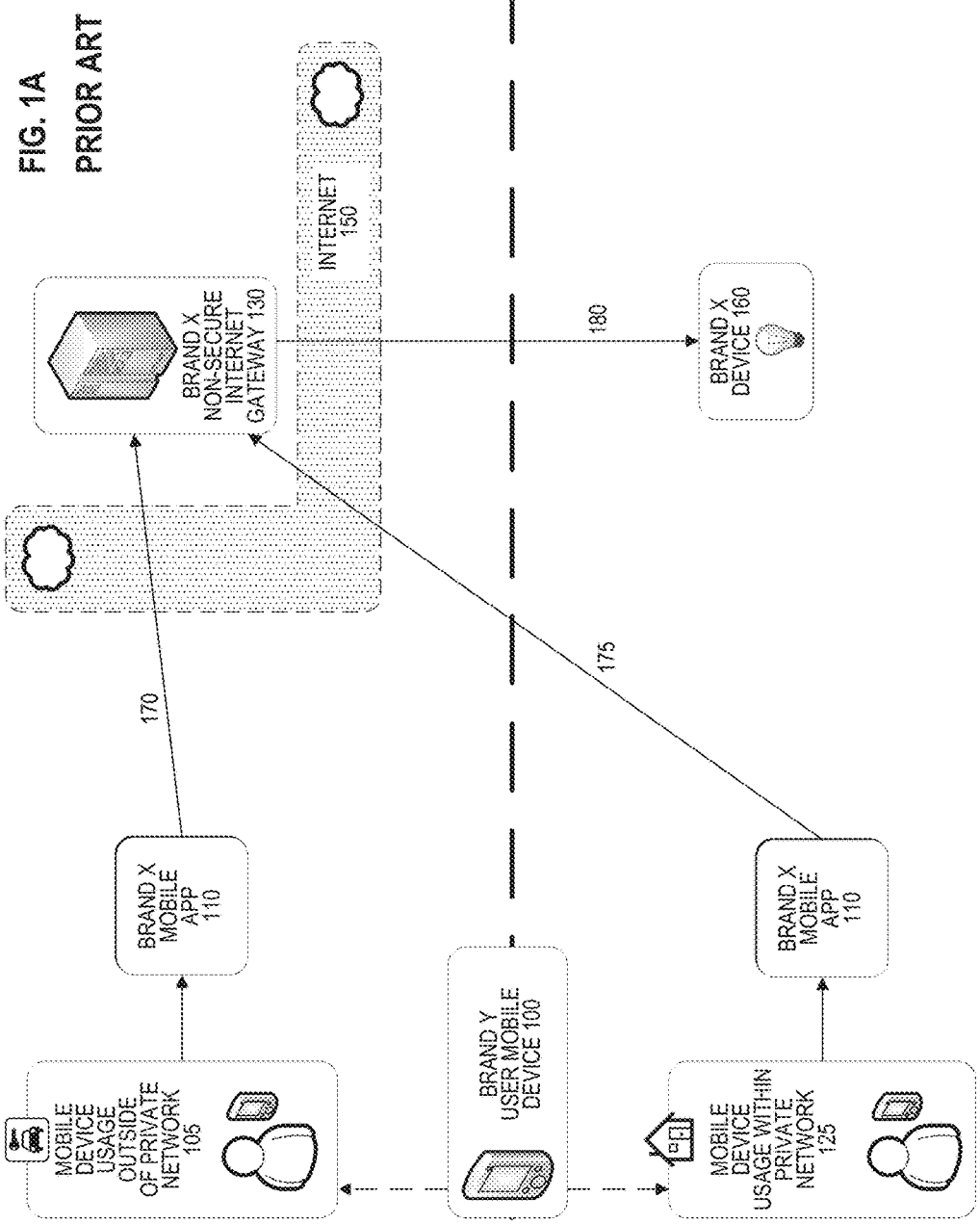

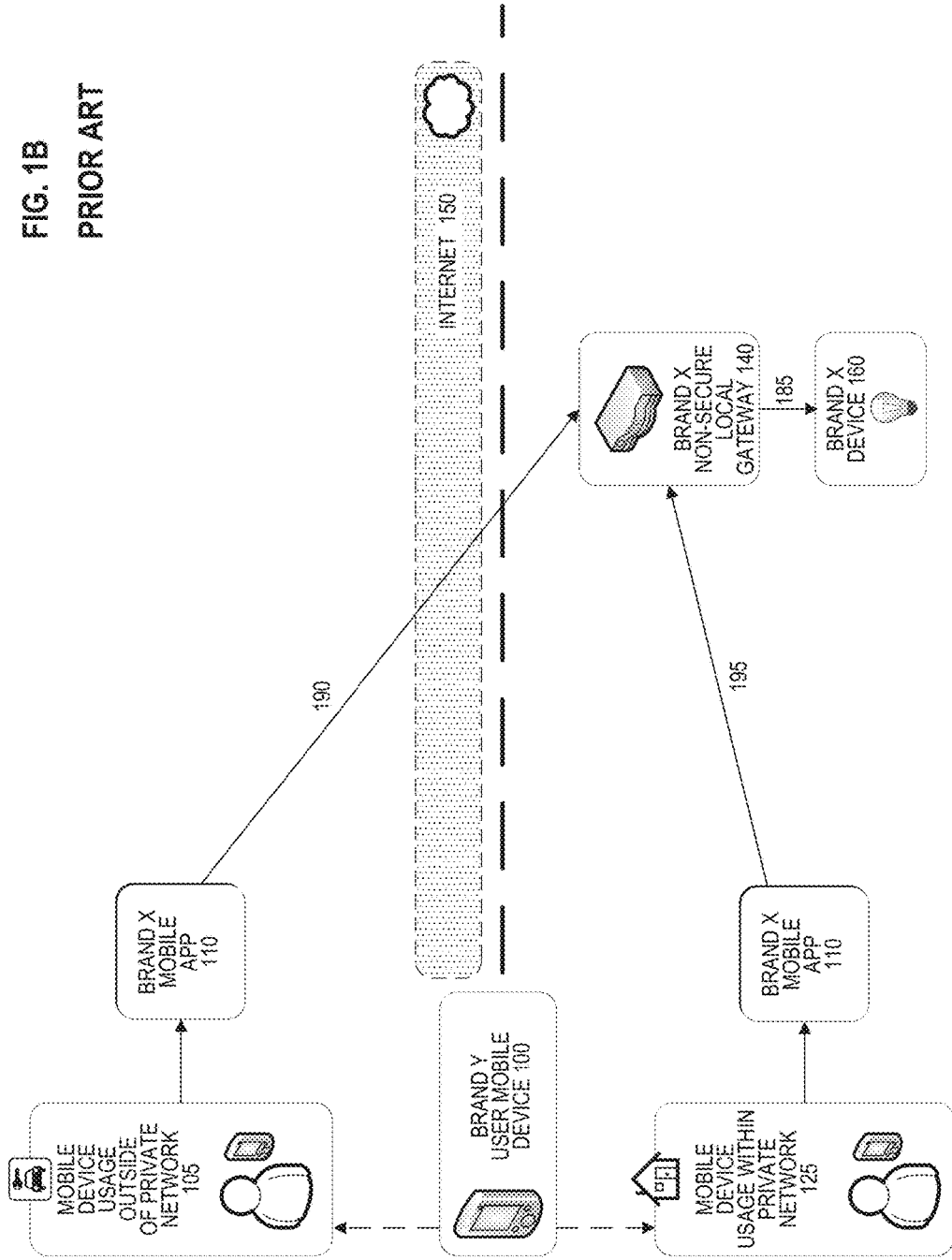

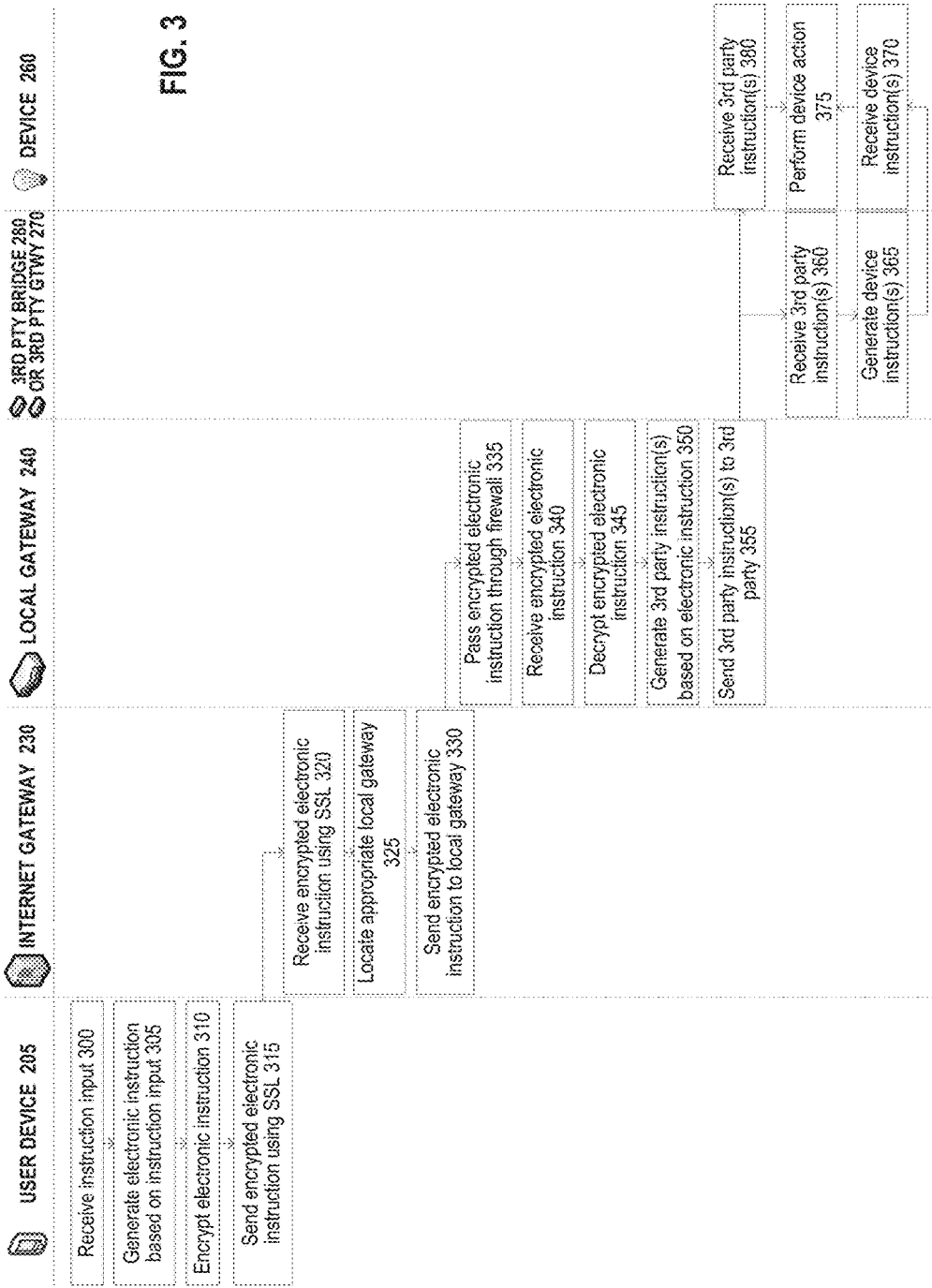

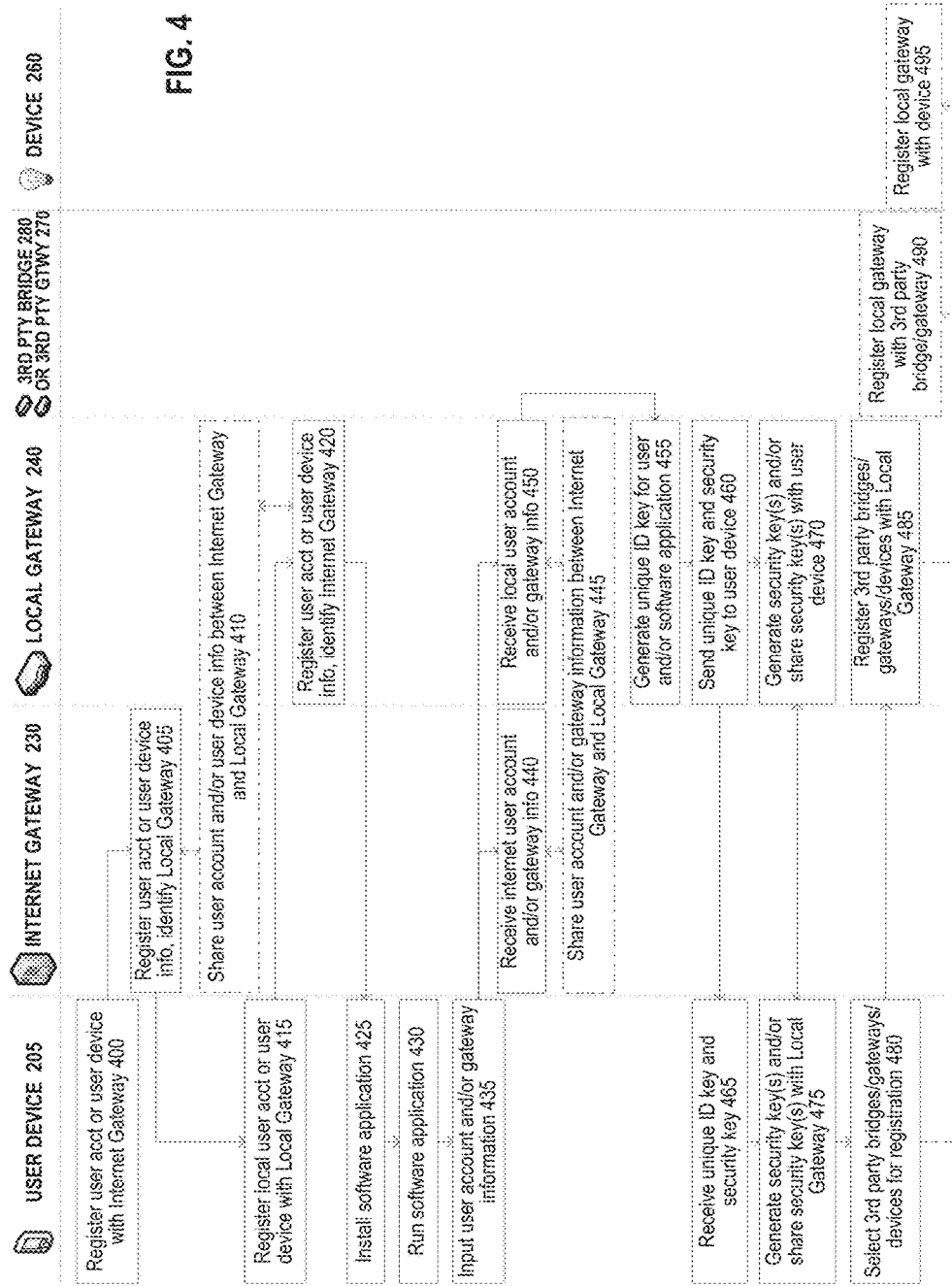

FIG. 5

LOCAL GATEWAY REGISTRATION DATABASE 500

| USER DEVICE 205 | SECURITY KEY 295 | PERMISSIONS 505 | SOFTWARE 510 | UNIQUE ID KEY 515 |
|---|---|---|---|---|
| USER DEVICE A | SECURITY KEY A | ADMINISTRATIVE + CONTROL (ALL DEVICES) | GATEWAY APP 215 + MGMT APP 220 | J82C#82&13 |
| USER DEVICE B | SECURITY KEY B | CONTROL (LIGHTS IN ROOM X) | GATEWAY APP 215 | 92C2$19XG |
| USER DEVICE C | SECURITY KEY B | CONTROL (STEREO IN VEHICLE X) | GATEWAY APP 215 | 72KCOO12Z |
| USER DEVICE D | SECURITY KEY D | VIEW ONLY (THERMOSTAT) [[EXPIRE IN 24 HRS]] | 3RD PARTY APP 210 | CK28K2J9&Y |

SECURING INTERNET OF THINGS COMMUNICATIONS ACROSS MULTIPLE VENDORS

CROSS-REFERENCE TO RELATED APPLICATIONS

This application is a continuation and claims the priority benefit of U.S. patent application Ser. No. 15/340,449 filed Nov. 1, 2016, now U.S. Pat. No. 9,825,921 which is a continuation and claims the priority benefit of U.S. patent application Ser. No. 14/722,064 filed May 26, 2015, now U.S. Pat. No. 9,485,231, the disclosures of which are incorporated herein by reference.

BACKGROUND OF THE INVENTION

1. Field of the Invention

The present invention generally relates to network-connected devices. More specifically, the present invention relates to providing secure communications for multiple network-connected devices from different vendors or manufacturers.

2. Description of the Related Art

The phrase "internet of things" refers to network-connected devices that may receive inputs from a computer network and/or transmit outputs to the computer network. For example, a network-connected "internet of things" lightbulb might be controllable from a user's smartphone device, so that a user could turn his/her lights on or off without having to push a physical light switch. Similarly, a network-connected "internet of things" automobile might provide gas mileage data to a user's smartphone. Other "internet of things" devices may be thermostats, smart watches, or washing machines.

Due to decreased costs and sizes of computer components and wireless network connection modules, more and more network-connected "internet of things" devices are being produced. As production of network-connected "internet of things" devices has increased, several major problems have emerged: trust, identity, and interoperability.

Some network-connected "internet of things" devices can communicate with a user's mobile device through either a potentially untrustworthy non-secure internet gateway system 130 through a public internet connection, or alternately, through a non-secure local gateway system 140 with improper identity verification.

FIG. 1A illustrates a prior art architecture for communications between a user mobile device and a set of network-connected devices through a non-secure internet gateway. Some network-connected "internet of things" devices (e.g. a particular network-connected device 160 produced by a particular brand or manufacturer such as "Brand X") can communicate with a user mobile device 100 through an internet gateway system 130 using a connection that goes through the public Internet 150. The user mobile device 100 must often be produced by a particular brand (e.g., "Brand Y") that is designed to communicate with devices 160 of "Brand X" (which may in some cases be the same brand as "Brand Y") through a mobile software application ("app") 110, generally also produced by the same "Brand X" that produces the devices 160.

The user must blindly trust the internet gateway 130's managing entity (e.g., typically the same "Brand X" that produced the device 160), which could potentially view and/or alter the user's communications between the user mobile device 100 (e.g. originating from "Brand X" mobile software app 110) and the user's network-connected "internet of things" devices 160.

This could allow the internet gateway 130's managing entity (e.g. "Brand X") to track the user's actions and whereabouts (e.g., by tracking when the user turns lights on or receiving a location from a user's vehicle) of even health data about the user. The internet gateway 130's managing entity (e.g. "Brand X") could intentionally sell or give a user's personal data to a third party, or could unintentionally leak this data to a third party via a compromised connection (e.g. man-in-the-middle attack at connection 170, connection 175, or connection 180) or a compromised machine (e.g. malware at the non-secure internet gateway 130). The non-secure internet gateway 130's managing entity (e.g. "Brand X"), or a third party accessing the internet gateway 130 or its various connections (e.g., connection 170, connection 175, or connection 180), could even potentially control the user's network-connected "internet of things" devices 160 themselves by transmitting commands appearing to come from the user mobile device 100 through the internet gateway 130. Such third party control could be annoying (e.g., turning off lights when the user is home), wasteful (e.g., turning on lights when the user is not home), property-damaging (e.g. flooding a washing machine or overheating an oven), or potentially life-threatening (e.g., causing the user's vehicle to swerve).

Typically, a non-secure internet gateway 130 as depicted in FIG. 1A (e.g., managed by "Brand X") is not designed to function with network devices 160 from brands or manufacturers other than the brand or manufacturer of the internet gateway 130 (e.g., "Brand X"). The Brand X internet gateway 130 typically communicates with any connected network-connected devices 160 (e.g., connection 180) using proprietary protocols or even connection types (e.g. proprietary cables). Thus, the Brand X internet gateway 130 cannot be used to control an ecosystem of network-connected devices 160 by multiple brands or manufacturers.

FIG. 1B illustrates a prior art architecture for communications between a user mobile device and a set of network-connected devices through a non-secure local gateway. Some network-connected "internet of things" devices 160 can communicate with a user's user device 100 through a local gateway 140 (typically produced by the producer of the device 160, such as by "Brand X") located within a private network without using an internet gateway 130 accessible via a public internet connection. This means that communications between the network-connected "internet of things" devices 160 and the local gateway 140 (e.g., communications via connection 185) are private network communications, though the communication between the user device 100 and the local gateway 140 may still travel through the public internet (e.g., connection 190) if the user is not connected to the same private network.

The approach of FIG. 1B is problematic because it cannot scale and it cannot guarantee the identity of client requests. In particular, implementing Secure Socket Layer (SSL) for communications between the user device 100 and the local gateway 140 can be problematic, particularly when the user device 100 is outside of the private network (e.g., use case 105 of FIG. 1B, connection 190).

A first method of implementing SSL in the context of connection 190 of FIG. 1B is to install and manage certificates using a certificate authority. A major problem with this approach is that this does not scale and is not manageable at a consumer level. The certificates might only be authorized temporarily, costs associated with the certificate authority might have to be paid by the consumer, and/or management operations may have to be performed by the consumer.

A second method of implementing SSL in the context of connection 190 of FIG. 1B is to use self-signed certificates from the local gateway 140 and subsequently get those certificates to clients. Such self-signed certificates are not as secure as certificates issued by certificate authorities, however. Further, use of self-signed certificates in this manner locks the local gateway into connecting with certain devices, excluding the ability to develop an ecosystem with multiple network-connected devices made by multiple brands/manufacturers.

A third method of implementing SSL in the context of connection 190 of FIG. 1B is to use self-signed certificates while clients ignore signature validation. This is almost entirely non-secure.

The connection 190 otherwise transfers communications without the use of SSL, which is non-secure.

Because SSL is not feasible to reliably implement while maintaining interoperability, the connections of FIG. 1B cannot guarantee the identity of senders of communications to recipients. Thus, if the user mobile device 100 sends a communication to the local gateway 140 (e.g., to turn on a network-connected light bulb), a malicious party can compromise the connection and perform a man-in-the-middle attack or a replay attack. Thus, the malicious party could view or change the user's command or trigger a command at a different time.

Typically, a local gateway 140 as depicted in FIG. 1B (e.g., managed by "Brand X") is not designed to function with network devices 160 from brands or manufacturers other than the brand or manufacturer of the local gateway 140 (e.g., "Brand X"). The Brand X local gateway 140 typically communicates with any connected network-connected devices 160 (e.g., connection 180) using proprietary protocols or even connection types (e.g. proprietary cables). Thus, the Brand X local gateway 140 cannot be used to control an ecosystem of network-connected devices 160 by multiple brands or manufacturers. Such interoperability issues can make communication with inconvenient multiple network-connected "internet of things" devices inconvenient, slow, and cumbersome for a user. This may also force a user to be locked into a single brand or manufacturer or network-connected "internet of things" devices or mobile devices, potentially limiting the user's choices and functionalities and forcing the user to pay more to buy devices by a particular brand or manufacturer.

There is, therefore, a need in the art for an improved "internet of things" ecosystem for securely controlling a variety network-connected "internet of things" devices from a control point of the user's choice.

SUMMARY OF THE CLAIMED INVENTION

One exemplary method for secure communications includes receiving an encrypted electronic instruction at a local gateway from an internet gateway. The encrypted electronic instruction is based on an electronic instruction generated by a user device, the electronic instruction encrypted by the user device using a first security key stored in a user memory of the user device. The method may include decrypting the encrypted electronic instruction at the local gateway using a second security key stored in a local memory of the local gateway. The method also includes transmitting a device instruction from the local gateway. The device instruction is based on the electronic instruction decrypted by the local gateway using the second security key, the device instruction to trigger a network-connected device to perform a device action.

One exemplary system for secure communications includes an internet gateway device and a local gateway device. The internet gateway device is communicatively coupled to a user device and the local gateway device. Execution of internet gateway instructions stored in an internet memory of the internet gateway by an internet gateway processor of the internet gateway device performs a variety of internet gateway operations. The internet gateway operations include receiving an encrypted electronic instruction from the user device over a secure connection, the encrypted electronic instruction being an electronic instruction that was generated by the user device and then encrypted by the user device using a first security key stored in a user memory of the user device. The internet gateway operations also include transmitting the encrypted electronic instruction to the local gateway device. The local gateway device is communicatively coupled to the internet gateway and a network-connected device. Execution of local gateway instructions by a local gateway processor of the local gateway device performs a variety of local gateway operations. The local gateway operations include receiving the encrypted electronic instruction from the internet gateway based on the encrypted electronic instruction first passing through a firewall. The local gateway operations include decrypting the encrypted electronic instruction using a second security key stored in a local memory of the local gateway. The local gateway operations also include transmitting a device instruction from the local gateway, the device instruction based on the electronic instruction decrypted by the local gateway using the second security key, the device instruction to trigger a network-connected device to perform a device action.

One exemplary non-transitory computer-readable storage medium may have embodied thereon a program executable by a processor to perform a method for secure connections. The exemplary program method may include receiving an encrypted electronic instruction at a local gateway from an internet gateway. The encrypted electronic instruction is based on an electronic instruction generated by a user device, the electronic instruction encrypted by the user device using a first security key stored in a user memory of the user device. The program method may include decrypting the encrypted electronic instruction at the local gateway using a second security key stored in a local memory of the local gateway. The program method may include transmitting a device instruction from the local gateway. The device instruction is based on the electronic instruction decrypted by the local gateway using the second security key, the device instruction to trigger a network-connected device to perform a device action.

BRIEF DESCRIPTION OF THE FIGURES

FIG. 1A illustrates a prior art architecture for communications between a user mobile device and a set of network-connected devices through a non-secure internet gateway.

FIG. 1B illustrates a prior art architecture for communications between a user mobile device and a set of network-connected devices through a non-secure local gateway.

FIG. 3 is a flow diagram illustrating exemplary communication operations of an exemplary architecture for secure communications.

FIG. 4 is a flow diagram illustrating exemplary setup operations of an exemplary architecture for secure communications.

FIG. 5 illustrates an exemplary local gateway registration database detailing information about multiple user devices registered with a single secure local gateway.

DETAILED DESCRIPTION

Embodiments of the present invention are directed generally to systems and methods of for secure communications between a user device and a set of network-connected devices.

A secure connection between a user mobile device and a "Internet-of-Things" network-connected device (e.g. a home appliance or a vehicle) may be provided using an internet gateway residing in the public internet and a local gateway residing in a private network behind a firewall. The user device may receive an input through a software application and may generate an electronic instruction based on the input. The user device may then encrypt the electronic instruction and send the encrypted electronic instruction to the internet gateway over a secure connection (e.g. SSH, TLS). The internet gateway then sends the encrypted electronic instruction to the local gateway, which decrypts the encrypted electronic instruction, interprets it, and generates and transmits a device instruction to communicate with the network-connected device, either directly or through an intermediary device such as a third-party bridge or hub. Only the user device and local gateway have encryption/decryption keys.

Figure 2:
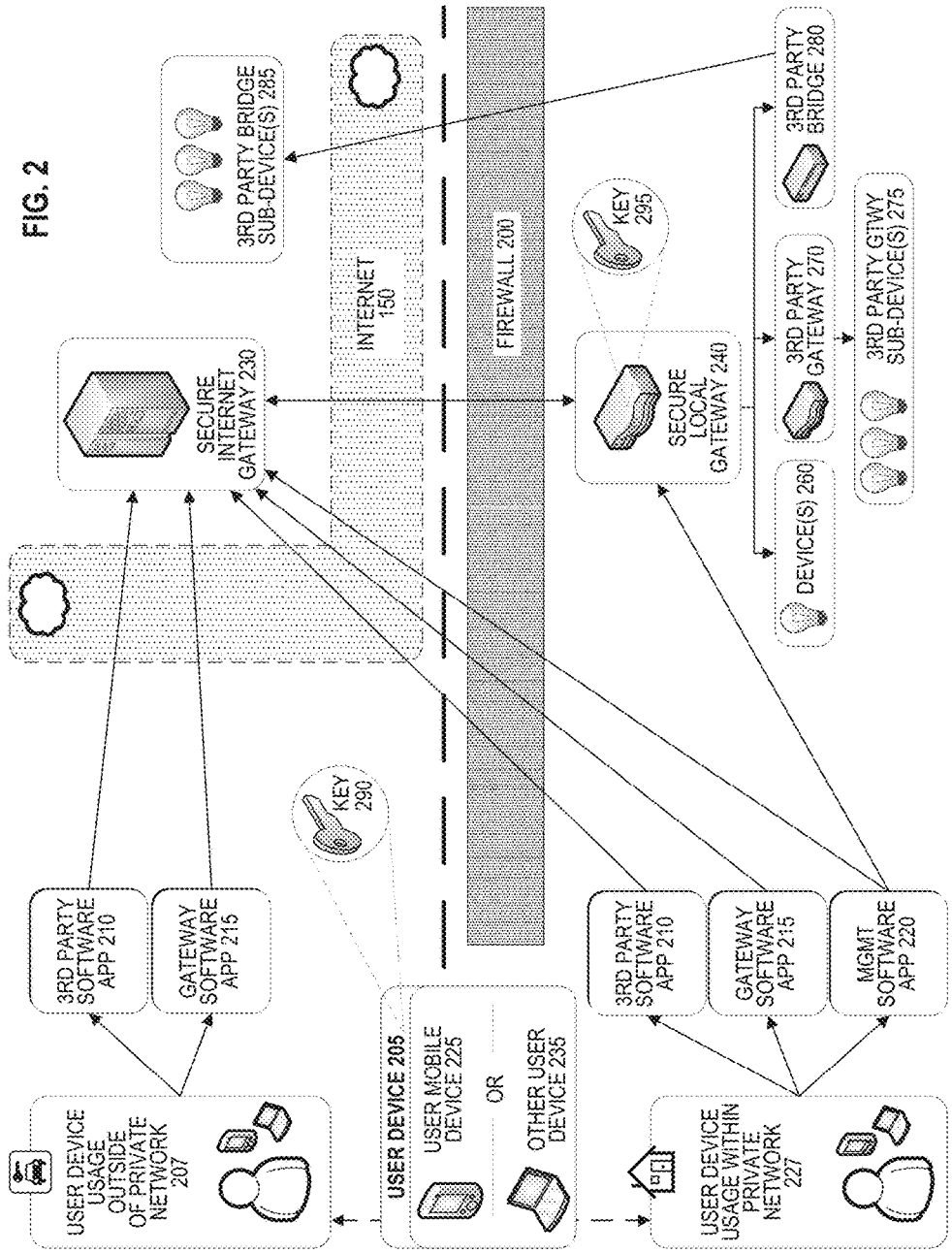
FIG. 2 illustrates an exemplary ecosystem for secure communications between a user device and a set of network-connected devices.

FIG. 2 illustrates an exemplary ecosystem for secure communications between a user device and a set of network-connected devices.

The secure communications ecosystem of FIG. 2 may include a user device 205, which may be a user mobile device 225 (which may be produced by "Brand Y" or another brand/manufacturer). The user mobile device 225 may be a smartphone device, a tablet device, a portable media player device, a wearable device, or a portable game console device. The user device 205 may also be another type of user device 235 that does not fall under the traditional "mobile" device category, such as a laptop computer, a desktop computer, a smart television, a home entertainment system, a home video game console, or another type of computer device.

The ecosystem may include a secure internet gateway 230, which may receive and transmit communications through a wired or wireless connection to the Internet 150. The secure internet gateway 230 may be any type of physical or virtual computer system or computerized device with access to the internet, such as a server, a laptop computer, a desktop computer, or any other type of network-connected device with a memory and a processor. The secure internet gateway 230 may receive and transmit communications using protocols based on Secure Sockets Layer (SSL) or Transport Layer Security (TLS), and be able to communicate with a certificate authority (CA). The secure internet gateway 230 may in some cases include a hardware firewall (not shown) or a software firewall (not shown) for filtering communications being received by the secure internet gateway 230 and/or transmitted by the secure internet gateway 230.

The secure internet gateway 230 may be a single computing device as illustrated in FIG. 2, or may alternately be one or more of a collection of computing devices connected in a network, or may be one or more of a collection of computing devices distributed throughout the Internet, or may be some combination thereof. In embodiments where the secure internet gateway 230 includes more than one computing device, the secure internet gateway 230 may include one or more computers systems run privately and/or may include one or more computer systems and/or virtual machines run by a third-party entity as a subscription service to be used by one or more individuals or groups.

The ecosystem may include a private network, which may be a local area network (LAN), a wireless local area network (WLAN), a municipal area network (MAN), or a wide area network (WAN). The private network may include a secure local gateway 240. The secure local gateway 240 may then be connected to various network-connected devices. This connection may be direct (e.g., device(s) 260), indirect through a third-party gateway (e.g., third-party gateway 270 and third-party gateway sub-devices 275), indirect through a third-party bridge (e.g., third-party bridge 280 and third-party bridge sub-devices 285), or some combination thereof.

Any connections to the secure local gateway 240 from outside of the private network (e.g., the connection between the secure internet gateway 230 and secure local gateway 230) may be filtered through a firewall 200. The firewall 200 may be a hardware firewall within the hardware of the secure local gateway 270 or within the hardware of a router (not shown). The firewall 200 may alternately be a software firewall stored in a memory of the secure local gateway 270 or stored in a memory of a router (not shown). The firewall 200 may alternately be some combination of a hardware and software firewall.

The user device 205 may be used within the private network as illustrated in usage case 227 of FIG. 2. The user device 205 may alternately be used outside of the private network as illustrated in usage case 207 of FIG. 2.

The user device 205 may store a variety of software applications, which may be mobile applications (e.g., applications developed for mobile operating systems such as Apple iOS, Google Android, Microsoft Windows Mobile, Blackberry OS) or may be traditional "desktop" software applications (e.g., applications developed for traditional computer operating systems such as Microsoft Windows, Apple OSX, Unix, Linux).

These software applications may include a gateway software application 215 designed specifically for interacting with the secure internet gateway 230 and/or secure local gateway. These software applications may also include a third-party software application 210 designed for interacting with one or more devices (e.g., device(s) 260), third-party gateways (e.g., third-party gateway 270), third-party bridges (e.g. third-party bridge 280), or some combination thereof. These software applications may also include a management software application 220 designed to be used within the private network (e.g., usage case 227 of FIG. 2) to communicate with and manage the secure local gateway 240.

The user device 205 may store, in a memory of the user device 205, a security key 290. The secure local gateway 240 may store, in a memory of the secure local gateway 240, a security key 295. The security key 290 and the security key 295 may be symmetric security keys (e.g., security key 290 may be entirely identical or at least partially identical to security key 295 in terms of the data of which the keys are comprised). The security key 290 and the security key 295 may alternately be asymmetrical security keys, such as private and public keys of a Public Key Infrastructure (PKI). More security keys (not shown) may also be stored by the user device 205 and/or the secure local gateway 240.

The security key 290 of the user device 205 may be stored within (or otherwise accessible to) one or more of the third-party software application 210, the gateway software application 215, and/or the management software application 220. The security key 290 may alternately be stored in a memory or storage component of the security key 290. The security key 290 may be stored encrypted on the user device 205. Similarly, the security key 295 may be stored encrypted on the secure local gateway 240.

The management software application 220 may in some cases be used to set up a link between a user device 205 and the local gateway 240. Toward this end, the management software application 220 may execute or assist in executing at least some of the operations performed by the user device 205 described in the flow diagram of FIG. 4. In some cases, multiple user devices 205 may be registered with a single local gateway 240. In such cases, different user devices 205 may each store different security keys 290, and may each be associated with different security keys 295 at the local gateway 240. Further, different user devices 205 may each be associated with different permissions 505, which may be used to limit a particular user device's control (e.g., user device A has administrative rights over other user devices' associated permissions, and has full control of all devices, while user device B only has control over lights in a single room). Situations in which multiple user devices 205 are registered with a single local gateway 240 may be handled with the aid of a local gateway registration database 500 stored within a memory of the local gateway 240 (or a memory accessible by the local gateway 240). An exemplary local gateway registration database 500 is illustrated in FIG. 5.

The secure local gateway 240 may in some cases include a discovery protocol, which it may use to discover at least one of a user device 205, a network-connected device 260, a third-party gateway 270, a sub-device 275, a third-party bridge 280, or a subdevice 285. The secure local gateway 240 and secure internet gateway 230 may in some cases locate each other using a discovery protocol through one or both systems. The secure local gateway 240 may also in some cases include an application programming interface (API) conforming to Representational State Transfer (REST) constraints (e.g., a RESTful API).

While the arrows illustrated in FIG. 2 illustrate exemplary an exemplary communication from the user device 205 to network-connected device(s) 260 (or sub-devices 275 or sub-devices 285), it should be understood that the direction of these arrows may be reversed in order to illustrate an exemplary communication from the network-connected device(s) 260 (or sub-devices 275 or sub-devices 285) to the user device 205 (e.g., a thermostat reporting the current temperature to the user device 205, or reporting that a requested operation was completed).

FIG. 3 is a flow diagram illustrating exemplary communication operations of an exemplary architecture for secure communications. In particular, the communication operations illustrated in FIG. 3 allow a user device 205 to transmit a communication to a network-connected "internet of things" device 260. The process could alternately be reversed in order for the network-connected device 260 to transmit a communication to the user device 205.

The communication operations begin with the user device 205 receiving an instruction input in step 300. The instruction input may be any type of input at a user device 205, such as a touch-based input at a touchscreen of the user device 205, or a keyboard-based input, or a mouse-based input, or a voice-and-microphone-based input. The user device 205 may then generate an electronic instruction based on the instruction input in step 305. Generating the electronic instruction in step 305 may alternately be based on an automatic trigger, such as one preset by a user or one recommended by the manufacturer of the user device 205 or network-connected device 260. For example, the generating the electronic instruction in step 305 may be based on a location (e.g., the user device 205 is close to home, triggering an automatic instruction input that a garage door should be opened or a thermostat should be powered on), based on a sensor (e.g., detecting using a sensor of the user device 205 that the user device 205 is cold, triggering an automatic instruction input that a thermostat should be adjusted or powered on), or based on a time and/or preset instructions (e.g., detecting that it is 6:30 AM, triggering an automatic instruction input to turn on a set of lights and/or an audio system in order to wake up a user according to preset instructions or a determined schedule).

Once the electronic instruction is generated in step 305, the user device 205 may encrypt the electronic instruction using security key 290 stored at the user device 205 to generate an encrypted electronic instruction in step 310. In step 315, the user device 205 may then transmit the encrypted electronic instruction to the secure internet gateway 230 using SSL or TLS, which may itself involve a second layer of encryption on top of the encryption performed in step 310.

In step 320, the secure internet gateway 230 may then receive the encrypted electronic instruction transmitted by the user device 205 in step 315. The use of SSL and/or TLS allows the secure internet gateway 230 certainty that the encrypted electronic instruction was truly transmitted by the user device 205. Significantly, the secure internet gateway 230 does not store a security key capable of decrypting the encrypted electronic instruction from the encryption performed at step 310. This means that if the secure internet gateway 230, or any connections going to or from it, are compromised by a third party (e.g., a malicious hacker or snooping government entity), the third party will have no ability to view or change the contents of the electronic instruction generated by the user device 205 in step 305. Similarly, if the entity managing the secure internet gateway 230 receives a subpoena order to turn over the contents of the electronic instruction generated by the user device 205 in step 305 to a third party, the entity managing the secure internet gateway 230 will be unable to turn over anything other than the still-encrypted electronic instruction. This protects the privacy of a user of the user device 205.

In step 325, the secure internet gateway 230 may then locate the appropriate secure local gateway 240 to which to transmit the encrypted electronic instruction. The secure internet gateway 230 may do this a variety of ways. For example, the user device 205 could "register" with the internet gateway 230 prior to transmitting any encrypted electronic instructions intended for network-connected device 260. During such a registration process, a user could identify a particular secure local gateway 240 to be used for all communications originating from the user device 205 that are bound for the network-connected device 260. This information could then be stored at a database, table, list, or other data structure (e.g. data structures described with respect to FIG. 5) at a memory accessible to the secure internet gateway 230. One example of this type of registration process at the secure internet gateway 230 is illustrated in FIG. 4. Alternately, the encrypted electronic instruction could be transmitted in step 315 along with unencrypted information identifying a particular secure local gateway 240 to which that encrypted electronic instruction should be sent. Even if a malicious third party was somehow able to change this unencrypted information identifying the particular secure local gateway 240 to which that encrypted electronic instruction should be sent, the contents of the electronic instruction would still be encrypted and thus unreadable to any device other than the secure local gateway originally identified by the user device 205.

Once the secure internet gateway 230 identifies an appropriate secure local gateway 240 to transmit the encrypted electronic instruction to in step 325, the secure internet gateway 230 may then transmit the encrypted electronic instruction to the identified appropriate secure local gateway 240 in step 330. In some instances, the encrypted electronic instruction may be transmitted from the secure internet gateway 230 to the identified appropriate secure local gateway 240 using SSL and/or TLS for an additional layer of security as described regarding the transfer of step 315 and step 320.

Once the secure internet gateway 230 transmits the encrypted electronic instruction to the secure local gateway 240 in step 330, the transmitted encrypted electronic instruction may first pass through a firewall 200 in step 335. The firewall 200 may be a hardware firewall, a software firewall, or some combination thereof, as described in relation to FIG. 2. Though the firewall operation of step 335 is listed under the "local gateway 240" column of the flow diagram of FIG. 3, the firewall 200 may be located at the secure local gateway 240, at another device such as a router, or some combination thereof, as described in relation to FIG. 2. If the encrypted electronic instruction has somehow been tampered with at the secure internet gateway 230 or at a connection to or from the secure internet gateway 230, the firewall 200 may be used to detect any malicious tampering (e.g., tampering that inserts a virus, spyware, or other malware into the encrypted electronic instruction or data transmitted with the encrypted electronic instruction) and stop the tampered encrypted electronic instruction from reaching the secure local gateway 240. In some embodiments, the firewall 200 may be missing from the ecosystem and the communication operations, in which case step 330 may lead directly to step 340.

If the encrypted electronic instruction successfully passes through the firewall in step 335, the encrypted electronic instruction may then be received by the secure local gateway 240 in step 340. If the communication between the secure internet gateway 230 and the secure local gateway 240 was transmitted using SSL and/or TLS, this may involve an additional layer of encryption and decryption as described regarding the transfer of step 315 and step 320. The secure local gateway 240 may then decrypt the encrypted electronic instruction that it received in step 340 using the security key 295 stored at the secure local gateway 240 in step 345. The decryption operation of step 345 then produces a decrypted electronic instruction, which reproduces the content of the electronic instruction generated by the user device 205 in step 305 before it was encrypted in step 310.

The secure local gateway 240 can then interpret the content of the decrypted electronic instruction in the context of the devices that the secure local gateway 240 is connected to (which may include, for example, a network-connected device 260, a third-party bridge 280, and/or a third-party gateway 270) and generate one or more third-party instructions based on the decrypted electronic instruction in step 350. For example, a particular network-connected device 260, third-party bridge 280, and/or a third-party gateway 270 could be equipped to only handle instructions in a particular format, which may be an open-source format or a proprietary format. In some cases, a single decrypted electronic instruction could translate to multiple third-party instructions (e.g., a single electronic instruction indicating that a thermostat should be set to a particular temperature may be split into a first third-party instruction powering on the thermostat and a second third-party instruction setting the thermostat to the particular temperature). Further, if the third-party instruction(s) are to be sent to a third-party bridge 280 and/or a third-party gateway 270, the third-party bridge 280 and/or a third-party gateway 270 must be able to interpret these and generate further device instructions for sub-devices connected to the third-party bridge 280 and/or a third-party gateway 270 (e.g. sub-devices 275 and/or sub-devices 280) in step 365. In some cases, a network-connected device 260, third-party bridge 280, and/or a third-party gateway 270 may be capable of interpreting the decrypted electronic instruction directly without needing to generate a third-party instruction, in which case the third-party instruction generated in step 350 may simply be the electronic instruction decrypted in step 345.

Once the third-party instruction(s) are generated in step 350, the third-party instruction(s) may then be received by the appropriate third-party device, which may be a network-connected device 260 in step 380 or a third-party gateway 270 or third-party bridge 280 in step 360.

If the secure local gateway 240 is directly connected to a network-connected device 260, the network-connected device 260 may receive the third-party instruction(s) in step 380, which the network-connected device 260 may then interpret and perform a device action in step 375. The device action of step 375 may be any action performable by a network-connected device 260, and may vary based on the type of device that the network-connected device 260 is. For example, the device action of step 375 may include adjusting a light bulb, playing a song on a stereo system, opening/closing a garage door, setting a thermostat temperature, heating up a car interior, opening a car sunroof, locking/unlocking a vehicle/building door, setting a kitchen appliance, checking a battery charge level, requesting a location of the network-connected device 260, or any number of other device actions.

If the secure local gateway 240 is directly connected to a third-party gateway 270 or third-party bridge 280, the third-party gateway 270 or third-party bridge 280 may receive the third-party instruction(s) in step 360. The third-party gateway 270 or third-party bridge 280 may then interpret the third-party instruction(s) and generate one or more device instruction(s) based on each of the third-party instruction(s) in step 365. For example, the third-party gateway 270 or third-party bridge 280 may be a "internet of things hub" associated with a particular brand or manufacturer that may then interpret and generate instructions to devices 260 associated with the same particular brand or manufacturer. The device instruction(s) may then be received by the network-connected device 260 in step 370, the network-connected device 260 may then interpret and perform a device action in step 375. The device action may be any may be any action performable by a network-connected device 260 as described above.

In some cases, a third-party gateway 270 or third-party bridge 280 may be connected to one or more secondary third-party gateway(s) 270 or secondary third-party bridge(s) 280 before finally reaching a network-connected device. This may require interpreting the third-party instruction received in step 360 and generating a secondary third-party instruction to send to the secondary third-party gateway(s) 270 or secondary third-party bridge(s) 280, where the secondary third-party gateway(s) 270 or secondary third-party bridge(s) 280 can then continue the communication operations from step 360 onward.

While the network-connected device 260, third-party bridge 280, and third-party gateway 270 are sometimes referred to herein as "third-party" devices, it should be understood that these may be produced or manufactured by a third party, or they may be produced or manufactured by the entity that produced or manufactured the secure local gateway 240, or they may be produced or manufactured by the entity that produced or manufactured the secure internet gateway 230, or they may be produced or manufactured by the entity that produced or manufactured the user device 205, or some combination thereof. Some or all of these devices may share a producer and/or manufacturer and/or managing entity. Some or all of these devices may be produced and/or manufactured and/or managed by separate entities.

While the flow diagram of FIG. 3 illustrates exemplary communication operations for a communication to be sent from the user device 205 to a network-connected device 260, it should be understood that similar communication operations can also be used for a communication to be sent from a network-connected device 260 to the user device 205 (e.g., a thermostat reporting the current temperature to the user device 205 or reporting that a requested operation was completed). In particular, the network-connected device 260 could transmit such a communication to the local gateway 240 (either directly or through one or more third-party bridge(s) 280 and/or third-party gateway(s) 270), where the local gateway 240 may encrypt the communication using security key 295. The local gateway 240 may send this encrypted communication to the internet gateway 230 over SSL, which may send it onward to the user device 205 over SSL, where the user device 205 may decrypt the communication using security key 290.

While FIG. 3 refers to the network-connected device 260, it should be understood that the network-connected device 260 of FIG. 3 may be a sub-device 275 or a sub-device 285 as illustrated in FIG. 2.

FIG. 4 is a flow diagram illustrating exemplary setup operations of an exemplary architecture for secure communications.

The setup operations may begin with registering a user account and/or a user device 205 with the secure internet gateway 230 in step 400. This may involve registering the user account information and/or the user device information with the secure internet gateway 230, and may optionally also involve identifying an secure local gateway 240 and storing data about the associated secure local gateway 240 with the secure internet gateway 230 in step 405. Information about the user account and/or user device 205 may be stored in a database or other data structure (e.g., data structures described with respect to FIG. 5) accessible by the secure internet gateway 230.

The setup operations may include registering a user account and/or a user device 205 at the secure local gateway 240 in step 415. This may involve registering the user account information and/or the user device information with the secure local gateway 240, and may optionally also involve identifying an secure local gateway 240 and storing data about the associated secure local gateway 240 with the secure internet gateway 230 in step 420. Information about the user account and/or user device 205 may be stored in a local gateway registration database (e.g., local gateway registration database 500 of FIG. 5) or other data structure (e.g., data structures described with respect to FIG. 5) accessible by the secure local gateway 240.

While the registration with the secure local gateway 240 in step 415 and step 420 is illustrated in FIG. 4 as taking place sequentially after the registration with the secure internet gateway 230, these may take place in reverse order and/or may take place at least partially in parallel. Further, in some embodiments, the secure internet gateway 230 and the secure local gateway 240 may share information about a user account and/or a user device 205 in step 410 in order to make the registration process more simple (e.g., so that, potentially, a user could register a user account and/or user device 205 with only one of the secure internet gateway 230 or secure local gateway 240 and have the registration transfer to the other automatically, or have at least some information transfer automatically).

Registering a user account and/or user device 205 with the secure local gateway 240 as discussed with respect to step 415 and step 420 be performed a variety of ways. For example, the secure local gateway 240 could receive a username and password from the user device 205 that is then stored at the secure local gateway 240. Alternately, the secure local gateway 240 could generate a temporary passcode for use by a user device 205, which may be a good solution for a "quick" registration, such as when the user device 205 is a user device 205 belonging to a visitor who won't need to interact with the secure local gateway 240 for very long. In some cases, registration of one user device 205 may be performed by a second user device 205 (e.g., where the second user device 205 has special administrative privileges 505 such as USER DEVICE A of FIG. 5 and/or where the second user device 205 has the management software application 220). In some cases, registering a user account and/or user device 205 with the secure internet gateway 230 as discussed in step 400 and step 405 may be performed similarly.

Once the user account and/or user device 205 are registered with the secure internet gateway 230 in step 405 and with the secure local gateway 240 in step 420, the user device 205 may install software applications (e.g., third-party software application 210, gateway software application 215, and/or management software application 220) that allow communication with a network-connected device 260 in step 425. The user device 205 may then run one of these software applications in step 430. In some cases, the user account information discussed above in steps 400-420 may be tied to a particular software application, and may be repeated for other software applications of the same user device 205.

The first time one of these software applications is run at the user device 205, the user device 205 may need to input user account information and/or information about a particular secure internet gateway 230 and/or a particular secure local gateway 240 in step 435. This may involve the secure internet gateway 230 then receiving information about the user account and/or about the secure local gateway 240 in step 440. This may also involve the secure local gateway 240 receiving information about the user account and/or about the secure internet gateway 230 in step 450. In some cases, the secure internet gateway 230 and secure local gateway 240 may share information about the user account of the user device 205 or software application or about each other in step 445.

The secure local gateway 240 may then generate a unique identification ("ID") key 515 intended to uniquely identify the user of the user device 205, the user device 205 itself, a software application run by the user device 205, or some combination thereof in step 455. In some cases, the unique ID key 515 may be a high-entropy key in cases where registration should be renewed, or in cases where registration for a particular user or user device or software application is intended to expire after a period of time (e.g., USER DEVICE D of FIG. 5). The secure local gateway 240 can then transmit the unique ID key 515 to the user device 205 in step 460. The user device 205 may then receive the unique ID key 515 in step 465 and store these in a memory accessible to the user device 205. In some cases, unique ID key 515 may be confined to use by a subset of the software applications stored at the user device 205.

The secure local gateway 240 and user device 205 may generate security key 290 and security key 295 at this stage in step 470 and step 475. This may be performed a number of ways. In one embodiment, the user device 205 may generate and store security key 490, and the secure local gateway 240 may generate and store security key 495, after which further security key data may be shared between the user device 205 and the secure local gateway 240 (e.g., if security key 290 and security key 295 are private PKI keys and the shared further security key data includes public PKI keys). In a second embodiment, the secure local gateway 240 may generate both security key 290 and security key 295, and may store security key 295 locally and transmit the security key 290 to the user device 205. In a third embodiment, the user device 205 may generate both security key 290 and security key 295, and may store security key 290 locally and transmit the security key 295 to the secure local gateway 240. The second and third embodiments may be performed relatively securely if the user device 205 and secure local gateway 240 are on the same private network (e.g., use case 207 of FIG. 2). While the security key generation and sharing steps illustrated by step 470 and step 475 are illustrated here, they may be performed at any other point in the setup operations. In some cases, security key 290 may be confined to use by a subset of the software applications stored at the user device 205.

The setup operations of FIG. 4 may also include selection of a network-connected device 260, a third-party bridge 280, and/or a third-party gateway 270 for registration in step 480. In particular, this could include transmitting information identifying the network-connected device 260, third-party bridge 280, and/or third-party gateway 270 to the secure local gateway 240 so that the secure local gateway 240 can readily communicate with these devices during the communication operations of FIG. 3. In some cases (not shown), step 480 may be performed at the secure local gateway 240 instead of at the user device 480. In some cases (not shown), step 480 may be performed, instead of at the user device 480, at the network-connected device 260, third-party bridge 280, and/or third-party gateway 270 to be registered. Regardless of how or where the selection of network-connected device 260, third-party bridge 280, and/or third-party gateway 270 for registration is to be performed for step 480, the secure local gateway 240 may then register the network-connected device 260, third-party bridge 280, and/or third-party gateway 270 in step 485.

In some embodiments, the network-connected device 260 may also register the secure local gateway 240 as an acceptable device to communicate with within a device database or other data structure (e.g., data structures of FIG. 5) accessible by the network-connected device 260 in step 495. In some embodiments, the third-party bridge 280 or third-party gateway 270 may also register the secure local gateway 240 as an acceptable device to communicate with within a third-party bridge/gateway database or other data structure (e.g., data structures of FIG. 5) accessible by the third-party bridge 280 or third-party gateway 270 in step 490.

While FIG. 4 refers to the network-connected device 260, it should be understood that the network-connected device 260 of FIG. 4 may be a sub-device 275 or a sub-device 285 as illustrated in FIG. 2.

FIG. 5 illustrates an exemplary local gateway registration database detailing information about multiple user devices registered with a single secure local gateway.

The local gateway registration database may include information about one or more user devices 205 (e.g., USER DEVICE A, USER DEVICE B, USER DEVICE C, USER DEVICE D). The user devices 205 may they each be associated with a security key, as indicated by the security key in the same row in the local gateway registration database 500 (e.g., SECURITY KEY A, SECURITY KEY B, SECURITY KEY D). The user devices 205 may each be associated with a permission setting 505, which can include, for example, administrative permissions (e.g., USER DEVICE A), device control permissions (e.g., USER DEVICE A, USER DEVICE B, USER DEVICE C), or view-only permissions (e.g., USER DEVICE D). The local gateway registration database 500 may also store information about what software applications are stored at each user device 205, and/or what software applications stored at each user device 205 are registered with the local gateway registration database 500. These software applications may include a third-party software application 210 (e.g., used by USER DEVICE D), a gateway software application 215 (e.g., used by USER DEVICE A, USER DEVICE B, and USER DEVICE C), and/or the management software application 220 (e.g., used by USER DEVICE A). The local gateway registration database 500 may also store unique ID key information 515, which may be used to uniquely identify the user of the user device 205, the user device 205 itself, a software application run by the user device 205, or some combination thereof (e.g., step 455 of FIG. 4). This may be a string of unique characters per user device 205, for example, as illustrated in the local gateway registration database 500 of FIG. 5. Thus, in FIG. 5, the unique ID key 515 is used to identify each user device 205. In some embodiments, some user devices 205 may be associated with multiple unique ID keys 515, one associated with each software application 510.

In some embodiments, two user devices 205 may be associated with the same security key 295 and/or unique ID keys 515. For example, USER DEVICE B and USER DEVICE C are both associated with SECURITY KEY B in exemplary database 500. This may indicate, for example, that USER DEVICE B and USER DEVICE C are commonly owned by a single user, and that SECURITY KEY B is associated with the common user rather than with a single user device 205. While the unique ID keys 515 of FIG. 5 are unique to each user device 205 rather than each user, in another embodiment, the unique ID keys 515 may be unique to each user rather than to each user device 205, in which case USER DEVICE B and USER DEVICE C could share a unique ID key 515 in the same way that they share SECURITY KEY B in FIG. 5.

One benefit of being able to adjust permissions 505 for multiple user devices 205 is to prevent an "evil sibling" problem. In particular, permissions 505 could be adjusted so that an "evil sibling" could not use his/her user device 205 to, for example, turn on the lights in his/her sibling's room in the middle of the night. For example, the permissions 505 associated with USER DEVICE B in the exemplary local gateway registration database 500 only allow control of lights in a single room.

Such permissions 505 could also prevent an "evil visitor" problem. In particular, permissions 505 could allow visitors some limited access to their host's network-connected devices (e.g., device 260) that may expire after a particular time period. For example, the permissions 505 associated with USER DEVICE D in the exemplary local gateway registration database 500 only allow for viewing, not control, of thermostat settings. Further, these viewing permissions are set to expire after 24 hours. Other permission expiration settings could be set as well, such as permission expiration settings set to expire after a shorter or longer duration of time, permission expiration settings set to expire at a particular date or time instead of after a particular duration of time, location-based permission expiration settings (e.g., expire once the visitor's user device 205 disconnects from a particular private network or leaves a particular geographic region), event-triggered permission expiration settings (e.g., expire if the visitor's user device 205 tries to change a particular setting at a particular time or at all), or manual input-based permission expiration settings (e.g. expire once the another user device 205 triggers the permission expiration with an input).

While the local gateway registration database 500 is referred to as a "database," it should be understood that it may alternately be any data structure that can hold one or more pieces of data, such as a database, a table, a list, a matrix, an array, an arraylist, a tree, a hash table, a hash map, a string, a map, a graph, a flat data sequence file, an image, a queue, a heap, a memory, a stack, a set of registers, a set of records, a tree, a tuple, a union, or a similar data structure.

Figure 6:
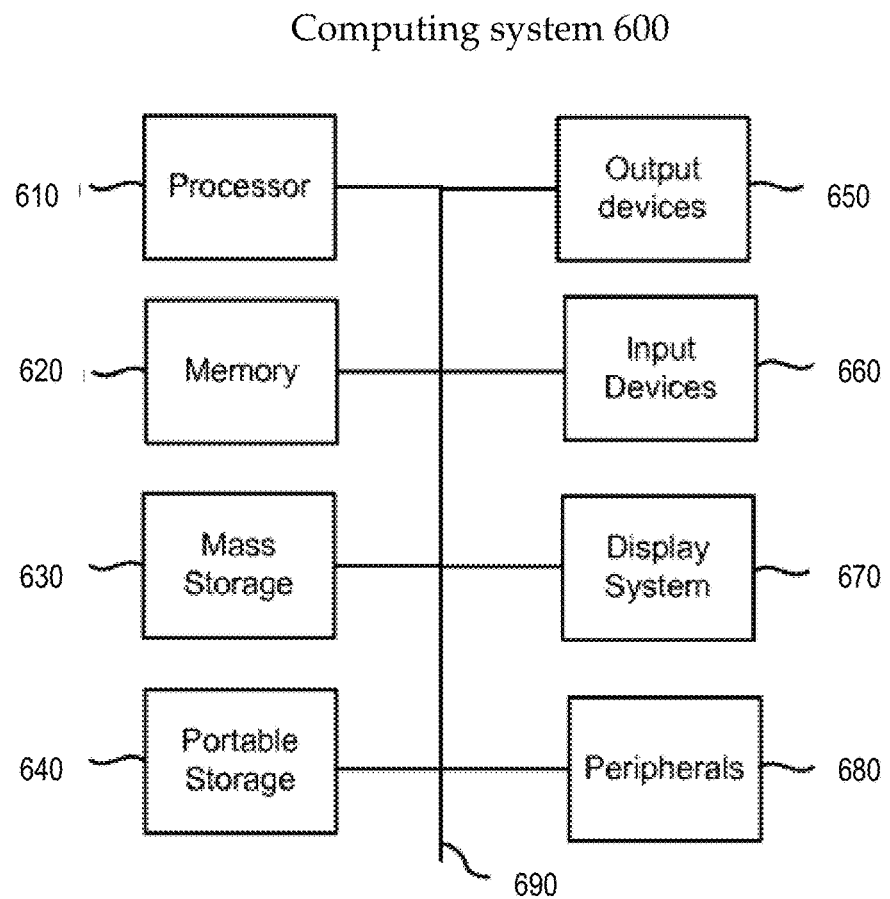
FIG. 6 is a block diagram of an exemplary computing device that may be used to implement an embodiment of the present invention.

FIG. 6 illustrates an exemplary computing system 600 that may be used to implement an embodiment of the present invention. For example, exemplary computing system 600 could represent a user device 205, a secure internet gateway 230, and/or a secure local gateway 230. The computing system 600 of FIG. 6 includes one or more processors 610 and memory 610. Main memory 610 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 610 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for managing secure computer communications, the method comprising:
   storing information in a memory of a local gateway that cross-references a first user device with a first security key and a first set of privileges associated with a network-connected device;
   storing information in the memory of the local gateway that cross-references a second user device with a second security key and a second set of privileges associated with the network-connected device;
   receiving at the local gateway a first encrypted message transmitted by the first user device via a network interface via an internet gateway, wherein the internet gateway does not store the cross-reference information;
   decrypting by the local gateway the first encrypted message using the received first security key, wherein the decrypted first message includes a command from the first user device to securely control the network-connected device associated with the local gateway;
   forwarding, from the local gateway, the command from the first user device to the network-connected device for execution in response to identifying that the command from the first user device is consistent with the first set of privileges cross-referenced to the first user device;
   receiving at the local gateway a second encrypted message transmitted by the second user device via the network interface;
   decrypting by the local gateway the second encrypted message using the received second security key to identify that the decrypted second message includes a command from the second user device to securely control the network-connected device associated with the local gateway; and
   preventing forwarding of the command from the second user device to the network-connected device in response to identifying that the command from the second user device is not consistent with the second set of privileges cross-referenced to the second user device.

2. The method of claim 1, further comprising the local gateway:
   generating the first security key;
   storing the first security key in a database, and
   sending the first security key to the first user device, wherein the first security key is stored at a local gateway device and at the first user device.

3. The method of claim 2, wherein the first security key is associated with at least one of the first user device or a first user of the first user device.

4. The method of claim 2, further comprising the local gateway:
   generating the second security key;
   storing the second security key in a database; and
   sending the second security key to the second user device, wherein the second security key is stored at the local gateway device and at the second user device.

5. The method of claim 4, wherein the second security key is associated with at least one of the second user device or a second user of the second user device.

6. The method of claim 1, further comprising the local gateway:
   receiving an encrypted message from an intermediary computing device between the first user device and the local gateway, wherein the intermediary computing device had received an initial version of the encrypted message and further encrypted the initial version to generate the encrypted message, and wherein the received encrypted message from the intermediary computing devices comprises a plurality of encryption levels; and
   identifying that at least a first level of decryption is to be performed on the received encrypted message, wherein the decryption of the received encrypted message includes decrypting at the least two levels of encryption.

7. The method of claim 1, wherein the network-connected device controls at least one of a home appliance, lights, or a vehicle.

8. A non-transitory computer-readable storage medium having embodied thereon a program executable by a hardware processor for performing a method for managing secure computer communications, the method comprising:
   storing information in a memory of a local gateway that cross-references a first user device with a first security key and a first set of privileges associated with a network-connected device;
   storing information in the memory of the local gateway that cross-references a second user device with a second security key and a second set of privileges associated with the network-connected device;
   receiving at the local gateway a first encrypted message from the first user device via a network interface via an internet gateway, wherein the internet gateway does not store the cross reference information;
   decrypting by the local gateway the first encrypted message using the received first security key, wherein the decrypted first message includes a command from the first user device to securely control the network-connected device associated with the local gateway;
   forwarding, from the local gateway, the command from the first user device to the network-connected device for execution in response to identifying that the command from the first user device is consistent with the first set of privileges cross-referenced to the first user device;
   receiving at the local gateway a second encrypted message from the second user device via the network interface;
   decrypting by the local gateway the second encrypted message using the received second security key to identify that the decrypted second message includes a command from the second user device to securely control the network-connected device associated with the local gateway; and preventing forwarding of the command from the second user device to the network-connected device in response to identifying that the command from the second user device is not consistent with the second set of privileges cross-referenced to the second user device.

9. The non-transitory computer-readable storage medium of claim 8, further comprising instructions executable for:
generating the first security key;
storing the first security key in a database, and
sending the first security key to the first user device, wherein the first security key is stored at a local gateway device and at the first user device.

10. The non-transitory computer-readable storage medium of claim 9, wherein the first security key is associated with at least one of the first user device or a first user of the first user device.

11. The non-transitory computer-readable storage medium of claim 9, further comprising instructions executable for:
generating the second security key;
storing the second security key in a database; and
sending the second security key to the second user device, wherein the second security key is stored at the local gateway device and at the second user device.

12. The non-transitory computer-readable storage medium of claim 11, wherein the second security key is associated with at least one of the second user device or a second user of the second user device.

13. The non-transitory computer-readable storage medium of claim 8, further comprising instructions executable for:
receiving an encrypted message from an intermediary computing device between the first user device and a local gateway device, wherein the intermediary computing device had received an initial version of the encrypted message and further encrypted the initial version to generate the encrypted message, and wherein the received encrypted message from the intermediary computing devices comprises a plurality of encryption levels; and
identifying that at least a first level of decryption is to be performed on the received encrypted message, wherein the decryption of the received encrypted message includes decrypting at the least two levels of encryption.

14. The non-transitory computer-readable storage medium of claim 8, wherein the network-connected device controls at least one of a home appliance, lights, or a vehicle.

15. An apparatus for managing secure computer communications, the apparatus comprising a local gateway that includes:

a memory that stores:
information that cross-references a first user device with a first security key and a first set of privileges associated with a network-connected device, and
information that cross-references a second user device with a second security key and a second set of privileges associated with the network-connected device;
a network interface that:
receives a first encrypted message from the first user device, and receives a second encrypted message from the second user device via an internet gateway, wherein the internet gateway does not store the cross reference information;
a hardware processor that executes instructions stored in memory, wherein execution of the instructions by the hardware processor;
decrypts the first encrypted message using the received first security key, wherein the decrypted first message includes a command from the first user device to securely control the network-connected device associated with the local gateway;
forwards the command from the first user device to the network-connected device via the network interface for execution in response to identifying that the command from the first user device is consistent with the first set of privileges cross-referenced to the first user device;
decrypts the second encrypted message using the received second security key to identify that the decrypted second message includes a command from the second user device to securely control the network-connected device associated with the local gateway; and
prevents forwarding of the command from the second user device to the network-connected device in response to identifying that the command from the second user device is not consistent with the second set of privileges cross-referenced to the second user.

16. The apparatus of claim 15, wherein the processor executes further instructions for generating the first security key, the memory further stores the first security key, and the network interface sends the first security key to the first user device.

17. The apparatus of claim 16, wherein the first security key is associated with at least one of the first user device or a first user of the first user device.

18. The apparatus of claim 16, wherein the processor executes further instructions for generating the second security key, the memory further stores the second security key, and the network interface sends the second security key to the second user device.

19. The apparatus of claim 15, wherein the second security key is associated with at least one of the second user device or a second user of the second user device.

* * * * *